United States Patent [19]

Harada et al.

[11] Patent Number: 5,915,357
[45] Date of Patent: Jun. 29, 1999

[54] APPARATUS FOR CONTROLLING NEGATIVE PRESSURE IN INTERNAL COMBUSTION ENGINE

[75] Inventors: Jun Harada; Hiroyuki Mizuno, both of Toyota, Japan

[73] Assignee: Toyota Kidosha Kabushiki Kaisha, Toyota, Japan

[21] Appl. No.: 08/881,200

[22] Filed: Jun. 24, 1997

[30] Foreign Application Priority Data

Oct. 17, 1996 [JP] Japan ................................. 8-274766
Jan. 23, 1997 [JP] Japan ................................. 9-010636

[51] Int. Cl.⁶ .......................... F02D 41/00; B60T 13/52
[52] U.S. Cl. ..................... 123/399; 123/295; 477/203; 477/206
[58] Field of Search ..................... 123/399, 361, 123/295; 477/203, 205, 206; 303/114.3

[56] References Cited

U.S. PATENT DOCUMENTS

| 3,799,303 | 3/1974 | Stoltman | 477/206 |
| 3,947,073 | 3/1976 | Cattaneo et al. | 477/203 |
| 5,826,559 | 10/1998 | Ichimoto et al. | 123/295 |
| 5,846,164 | 12/1998 | Harada | 477/205 |

FOREIGN PATENT DOCUMENTS

| A58-23244 | 2/1983 | Japan . |
| A61-21831 | 1/1986 | Japan . |
| A8-164840 | 6/1996 | Japan . |

*Primary Examiner*—Willis R. Wolfe
*Assistant Examiner*—Hieu T. Vo
*Attorney, Agent, or Firm*—Oliff & Berridge, PLC

[57] ABSTRACT

An apparatus for controlling brake force of a vehicle is disclosed. Each cylinders of a vehicle engine has a combustion chamber that receives fuel from a fuel injector and air from an air intake passage. The engine selectively performs a stratified charge combustion and a uniform charge combustion. The stratified charge combustion mode is selected to increase the amount of the air and the fuel supplied to the engine and improve a combusting state of the engine. The apparatus further includes a brake booster for increasing the brake force according to the negative pressure applied thereto. The brake booster is actuated by the negative pressure an amount of which is greater than a predetermined amount. Airflow in the air intake passage is restricted to generate the negative pressure. A fuel injector directly injects the fuel into the cylinder to set the engine to perform the stratified charge combustion. An electronic control unit (ECU) measures the an amount relating to the pressure applied to the brake booster. The ECU actuates the motor means to apply the negative pressure to the brake booster when the amount is smaller than the predetermined value and converts the driving condition of the engine from the stratified charge combustion to the uniform charge combustion.

14 Claims, 8 Drawing Sheets

APPARATUS FOR CONTROLLING NEGATIVE PRESSURE IN INTERNAL COMBUSTION ENGINE

BACKGROUND OF THE INVENTION

1. Field of the Invention

The present invention relates to apparatuses for controlling negative pressure in internal combustion engines. More particularly, the present invention pertains to apparatuses for controlling negative pressure in internal combustion engines that are provided with brake boosters, which use negative pressure to improve braking force.

2. Description of the Related Art

Brake boosters have become widely used in vehicles to decrease the required pressing force of the brake pedal. A typical brake booster uses negative pressure, which is produced in an intake passage downstream of a throttle valve, as a drive source. In other words, negative pressure is communicated to the brake booster through a communicating pipe connected to the downstream side of the throttle valve. Negative pressure corresponding to the pressed amount of the brake pedal acts on a diaphragm, which is incorporated in the brake booster, and increases the braking force.

However, internal combustion engines such as diesel engines do not control the amount of air intake during operation. Thus, it is difficult to produce negative pressure at the downstream side of the throttle valve. In such cases, vacuum pumps are provided to produce negative pressure for the brake booster.

Japanese Unexamined Patent Publication No. 61-21831 describes an apparatus that produces negative pressure for the brake booster when the vacuum pump malfunctions. The apparatus slightly closes the throttle valve to produce negative pressure at the downstream side of the throttle valve. The negative pressure is communicated to the brake booster.

However, the employment of a vacuum pump increases the engine load and degrades the fuel efficiency.

Furthermore, in engines that perform stratified charge combustion, stoichiometric air-fuel mixture is supplied to the vicinity of an ignition plug in a cylinder. The other portions of the cylinder are provided with only air. Hence, the throttle valve is substantially completely opened during normal running conditions. As a result, practically no negative pressure is produced at the downstream side of the throttle valve. This causes the negative pressure communicated to the brake booster to be insufficient.

SUMMARY OF THE INVENTION

Accordingly, it is an objective of the present invention to provide a provide an internal combustion engine that produces sufficient negative pressure for a brake booster when performing stratified charge combustion.

To achieve the above objective, the present invention provides an apparatus for controlling brake force of a vehicle movable based on rotation of an engine with a plurality of cylinders. Each of said cylinders has a combustion chamber that receives fuel from a fuel injector and air from an air intake passage. The air and fuel are mixed and combusted in the combustion chamber. The engine selectively performs a stratified charge combustion and a uniform charge combustion. The stratified charge combustion mode is selected to increase the amount of the air and the fuel supplied to the engine and improve a combusting state of the engine. The apparatus includes a brake booster for increasing said brake force in accordance with negative pressure applied thereto. The brake booster is actuated by the negative pressure an amount of which is greater than a predetermined amount. A restricting means restricts airflow in the air intake passage to generate the negative pressure that is supplied to the brake booster. A fuel injector directly injects the fuel into the cylinder to set the engine to perform the stratified charge combustion. A measuring means measures the amount relating to the pressure applied to the brake booster. A determining means determines the amount relating to the pressure in the brake booster being smaller than a predetermined value. An actuating means for actuating the restricting means to apply the negative pressure to the brake booster when the amount relating to the pressure in the brake booster is smaller than the predetermined value. The actuating means converts a running condition of the engine from the stratified charge combustion to the uniform charge combustion.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

One embodiment of an apparatus for controlling negative pressure in an internal combustion engine according to the present invention will now be described with reference to the drawings.

Figure 1:
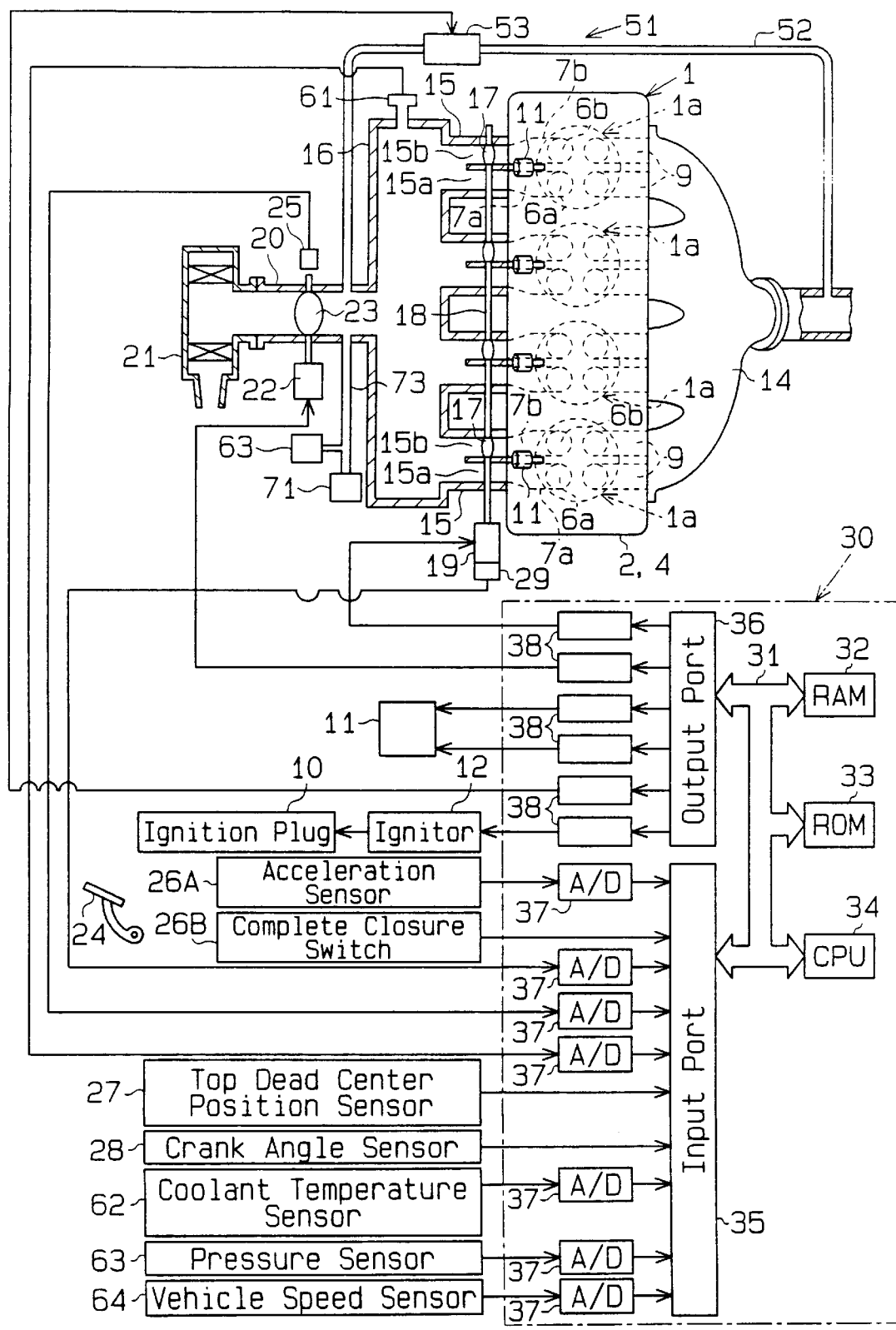
FIG. 1 is a diagrammatic drawing showing an apparatus for controlling negative pressure in an engine according to a first embodiment of the present invention.
Figure 2:
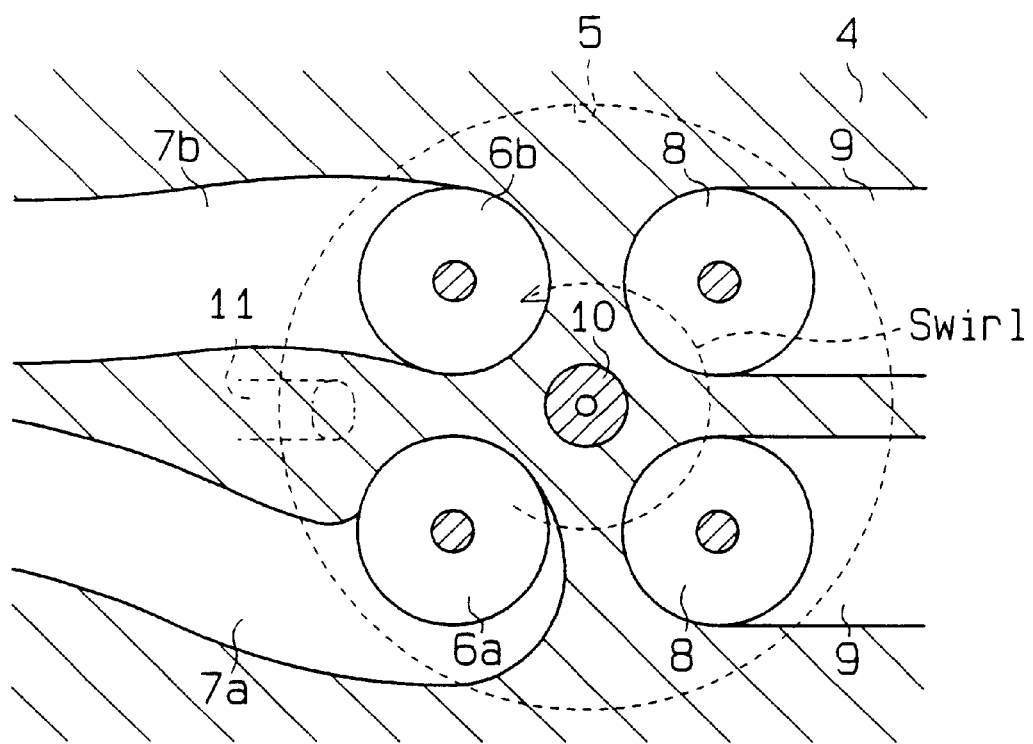
FIG. 2 is an enlarged cross-sectional view showing the cylinder engine.

As shown in FIG. 1, an engine 1 is provided with, for example, four cylinders 1a. The structure of the combustion chamber of each cylinder 1a is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. In this embodiment, four valves (first intake valve 6a, second intake valve 6b, and two exhaust valves 8) are provided for each cylinder 1a. The first intake valve 6a is provided with a first intake port 7a while the second intake valve 6b is provided with a second intake port 7b. Each exhaust valve 8 is provided with an exhaust port 9.

As shown in FIG. 2, the first intake port 7a is a helical port that extends in a helical manner. The second port 7b extends in a straight manner. Ignition plugs 10 are arranged at the middle of the cylinder head 4. High voltage is applied to each ignition plug 10 by an ignitor 12 though a distributor (not shown). The ignition timing of the ignition plugs 10 is determined by the output timing of the high voltage sent from the ignitor 12. A fuel injection valve 11 is arranged near the inner wall of the cylinder head at the vicinity of each set of first and second intake valves 6a, 6b. The fuel injection valve 11 is used to inject fuel directly into the associated cylinder 1a and enables both stratified charge combustion and uniform charge combustion.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30. The step motor 19 may be replaced by an actuating member controlled by the negative pressure in the intake ports 7a, 7b.

The surge tank 16 is connected to an air cleaner 21 through an intake duct 20. An electrically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5. The throttle valve 23 also adjusts the negative pressure produced in the intake duct 20.

A throttle sensor 25 is arranged in the vicinity of the throttle valve 23 to detect the opening angle (throttle angle TA) of the valve 23. The exhaust ports 9 of each cylinder 1a are connected to an exhaust manifold 14. After combustion, the exhaust gas is sent to an exhaust pipe (not shown) through the exhaust manifold 14.

A conventional gas exhaust recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to an exhaust duct. The EGR valve 53 includes a valve seat, a valve body, and a step motor (all of which are not shown). The opening area of the EGR valve 53 is altered by causing the step motor to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The recirculation amount of the exhaust gas is adjusted by the opening amount of the EGR valve 53.

Figure 3:
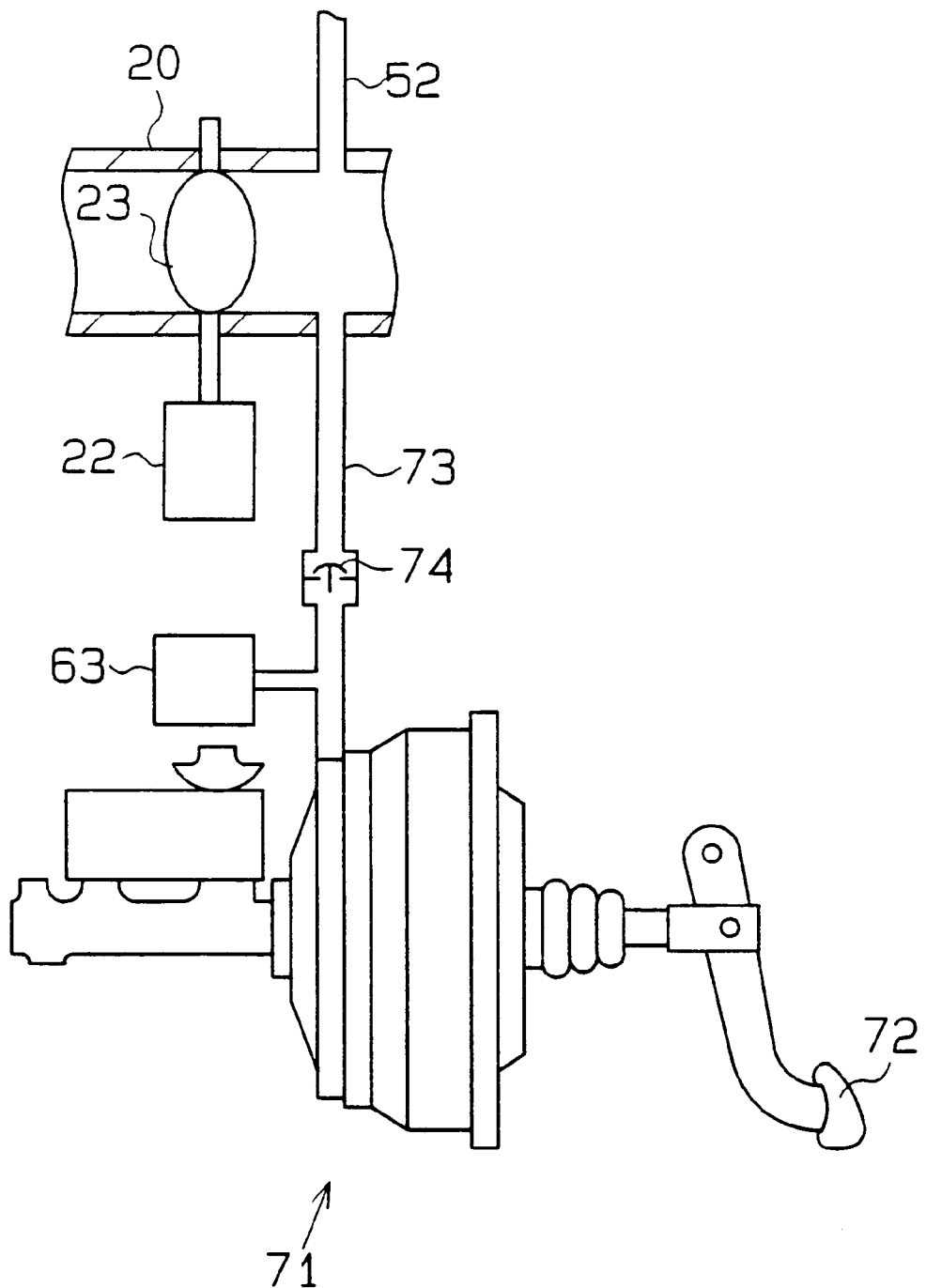
FIG. 3 is a schematic drawing showing the brake booster.

As shown in FIGS. 1 and 3, a brake booster 71 is provided to enhance the braking force of the vehicle. The brake booster 71 increases the pressing force of the brake pedal 72. The pressing force is converted to hydraulic pressure and used to actuate brake actuators (not shown) provided for each wheel. The brake booster 71 is connected to the downstream side of the throttle valve 23 in the intake duct 20 by a connecting pipe 73 and actuated by the negative pressure produced in the duct 20. A check valve 74, which is opened by the negative pressure produced in the intake duct 20, is provided in the connecting pipe 73 (FIG. 3). The brake booster 71 includes a diaphragm, which serves as an actuating portion. One side of the diaphragm communicates with the atmosphere. The negative pressure produced in the intake duct 20 and communicated through the connecting pipe 73 acts on the other side of the diaphragm. A pressure sensor 63 is arranged in the connecting pipe 73 to detect the pressure in the brake booster 71, or the brake booster pressure PBK (absolute pressure value).

The ECU 30 is a digital computer provided with a random access memory (RAM) 32, a read only memory (ROM) 33, a central processing unit (CPU) 34, which is a microprocessor, an input port 35, and an output port 36. A bidirectional bus 31 connects the RAM 32, the ROM 33, the CPU 34, the input port 35, and the output port 36 to one another.

An acceleration pedal 24 is connected to an acceleration sensor 26A. The acceleration sensor 26A generates voltage proportional to the degree of depression of the acceleration pedal 24. This enables the acceleration opening ACCP to be detected. The voltage output by the acceleration sensor 26A is input into the input port 35 by way of an analog to digital (A/D) converter 37. The acceleration pedal 24 is also provided with a complete closure switch 26B, which detects whether the acceleration pedal 24 is not pressed at all. The closure switch 26B outputs a complete closure signal XIDL set at one when the acceleration pedal 24 is not pressed at all and outputs a complete closure signal XIDL set at zero when the acceleration pedal 24 is pressed. The output voltage of the closure switch 26B is also input into the input port 35.

A top dead center position sensor 27 generates an output pulse when, for example, the piston in the first cylinder 1a reaches the top dead center position. The output pulse is input into the input port 35. A crank angle sensor 28 generates an output pulse each time a crankshaft of the engine 1 is rotated by a crank angle CA of 30 degrees. The output pulse sent from the crank angle sensor 27 is input into the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is input into the input port 35 by way of an A/D converter 37.

The throttle sensor 25 detects the throttle angle TA. The signal output of the throttle sensor 25 is input into the input port 35 by way of an A/D converter 37.

An intake pressure sensor 61 is provided to detect the pressure in the surge tank 16 (intake pressure PiM). The intake pressure PiM detected by the intake pressure sensor 61 when the engine 1 is started is substantially equal to the atmospheric pressure PA. Thus, the intake pressure sensor 61 also detects atmospheric pressure.

A coolant temperature sensor 62 is provided to detect the temperature of the engine coolant (coolant temperature THW). A vehicle speed sensor 64 is provided to detect the speed of the vehicle (vehicle speed SPD). The signal outputs of the sensors 61, 62, 64 are input into the input port 35 by way of A/D converters 37. The signal output of the pressure sensor 63 is also input into the input port 35 by way of an A/D converter 37.

The running condition of the engine 1 is detected by the throttle sensor 25, the acceleration sensor 26A, the complete closure switch 26B, the top dead center position sensor 27, the crank angle sensor 28, the swirl control valve sensor 29, the intake pressure sensor 61, the coolant temperature sensor 62, the pressure sensor 63, and the vehicle speed sensor 64.

The output port 36 is connected to the fuel injection valves 11, the step motors 19, 22, the ignitor 12, and the EGR valve 53 (step motor) by way of drive circuits 38. The ECU 30 optimally controls the fuel injection valves 11, the step motors 19, 22, the ignitor 12 (ignition plugs 10), and the EGR valve 53 with control programs stored in the ROM 33 based on signals sent from the sensors 25–29, 61–64.

Figure 4:
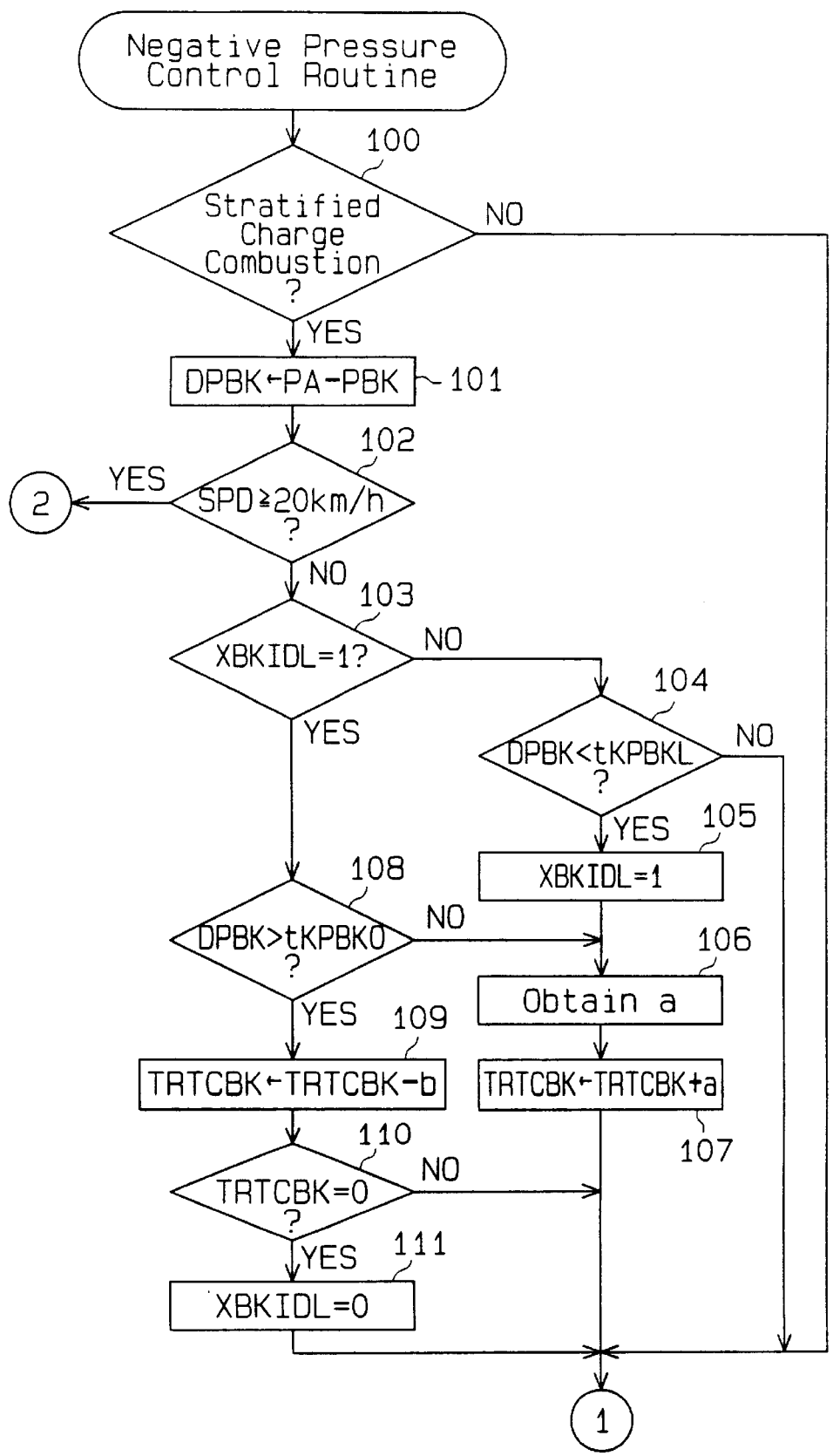
FIG. 4 is a flowchart illustrating the negative pressure control routine executed by the ECU.
Figure 5:
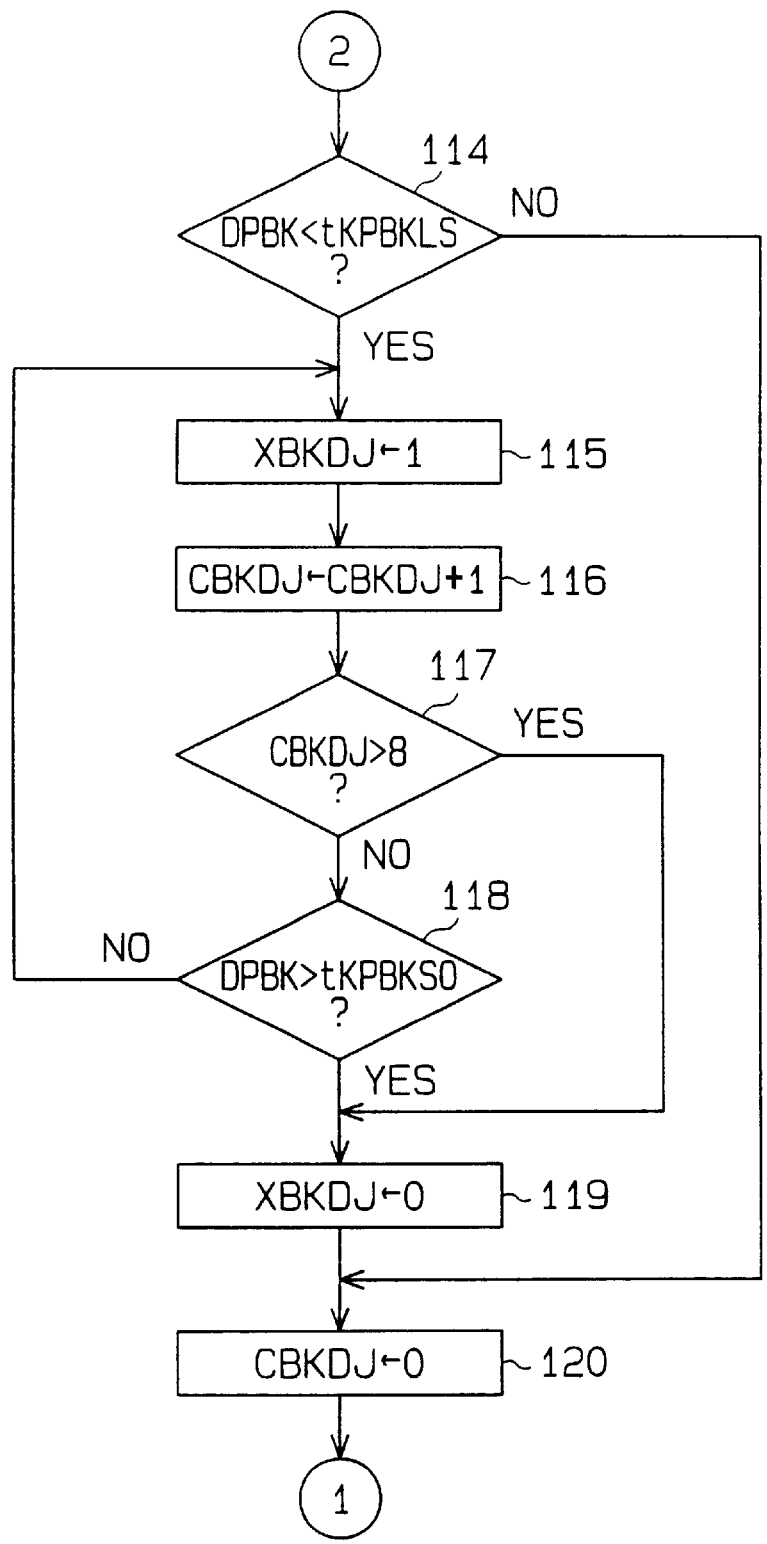
FIG. 5 is a flowchart illustrating the negative pressure control routing that continues from FIG. 4.
Figure 6:
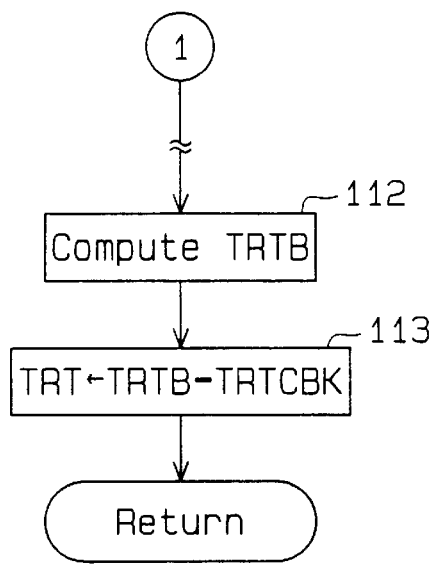
FIG. 6 is a flowchart illustrating the negative pressure control routine that continues from FIGS. 4 and 5.

Control programs stored in the apparatus for controlling negative pressure in the engine 1 will now be described with reference to the flowcharts shown in FIGS. 4–6. A routing executed to control the negative pressure communicated to the brake booster 71 by controlling the throttle valve 23 (the step motor 22) is illustrated in FIGS. 4–6.

When entering the routine, the ECU 30 first determines whether the engine 1 is presently performing stratified charge combustion in step 100. If stratified charge combustion is not being performed, the ECU 30 determines that the engine 1 is presently performing uniform charge combustion. This indicates that problems related with negative pressure are unlikely to occur. In this case, the ECU 30 proceeds to step 112.

In step 112, the ECU 30 computes the basic throttle angle TRTB from the present detecting signals (the acceleration opening ACCP, the engine speed NE, and other parameters). The ECU 30 refers to a map (not shown) to compute the basic throttle angle TRTB. The ECU 30 proceeds to step 113 and sets the final target throttle angle, or throttle opening area TRT, by subtracting the present throttle closing angle TRTCBK from the basic throttle angle TRTB. The ECU 30 then temporarily terminates subsequent processing. The ECU 30 then temporarily terminates subsequent processing. When the ECU 30 jumps from step 100 to step 112, the value of the throttle closing angle TRTCBK is set to zero. Thus, the basic throttle angle TRTB is set equal to the final target throttle opening area TRT.

In step 100, if it is determined that the engine 1 is performing stratified charge combustion, the ECU 30 proceeds to step 101. At step 101, the ECU 30 subtracts the most recent brake booster pressure PBK, which is detected by the pressure sensor 63, from the atmospheric pressure PA to obtain the pressure difference DPBK.

In step 102, the ECU 30 determines whether the present vehicle speed SPD is equal to or higher than a predetermined speed (e.g., 20 km/h). If the vehicle speed SPD is lower than the predetermined speed, the ECU 30 continues the stratified charge combustion mode and proceeds to step 103 to execute the throttle angle control (stratified charge brake control).

In step 103, the ECU 30 determines whether the flag XBKIDL that indicates the execution of the stratified charge brake control is set at one. The execution flag XBKIDL is set at one when producing negative pressure while performing the stratified charge combustion mode. If the execution flag XBKIDL is set at zero, that is, if the stratified charge control is not in process, the ECU 30 proceeds to step 104.

In step 104, the ECU 30 determines whether the present pressure difference DPBK is smaller than a predetermined negative pressure value tKPBLK (e.g., 300 mmHg), which initiates the stratified charge brake control. If the pressure difference DPBK is smaller than the negative pressure value tKPBLK, the ECU 30 proceeds to step 105.

In step 105, the ECU 30 sets the execution flag XBKIDL to one to enter the stratified charge brake control mode. The ECU 30 then proceeds to step 106 and computes the closing compensation angle a. To obtain the closing compensation value a, the ECU 30 refers to a map such as that shown in FIG. 7. In the map, the closing compensation angles a are indicated in correspondence with values that are obtained by subtracting the value of the pressure difference DPBK from the target negative pressure value tKPBKO (e.g., 350 mmHg). If the pressure difference DPBK is much smaller than the predetermined negative pressure value tKPBKO (i.e., if the subtracted value is large), the closing compensation angle a is set at a large value to increase the closing speed of the throttle value 23. On the contrary, the closing compensation angle a is set at a small value to decrease the closing speed of the throttle valve 23 when the pressure difference DPBK approaches the predetermined negative pressure value tKPBKO (i.e., when the subtracted value is small).

In step 107, the ECU 30 renews the throttle closing angle TRTCBK to a value obtained by adding the present closing angle compensation value a to the throttle closing angle TRTCBK of the previous cycle and then proceeds to step 112. In step 112, the ECU 30 computes the basic throttle angle TRTB. Then, in step 113, the ECU 30 sets the final target throttle opening area TRT by subtracting the present throttle closing angle TRTCBK from the basic throttle angle TRTB. Afterward, the ECU 30 temporarily terminates subsequent processing. Accordingly, if the ECU 30 carries out steps 103 to 107, the increasing value obtained by subtracting the throttle closing angle TRTCBK is set as the final target throttle opening area TRT.

In step 104, if the pressure difference DPBK is equal to or greater than the negative pressure value tKPBLK that initiates the stratified charge brake control, the ECU 30 jumps to step 112. In this case, stratified charge brake control is not executed.

If the execution flag XBKIDL is set at one in step 103, the ECU 30 proceeds to step 108 and determines whether the pressure difference DPBK exceeds the negative pressure value tKPBKO that terminates the stratified charge brake control. If it is determined that the pressure difference DPBK does not exceed the negative pressure value tKPBKO, the ECU 30 proceeds to step 106. The ECU 30 carries out steps 106, 107 and then proceeds to step 112 to compute the basic throttle angle TRTB. Subsequently, in step 113, the ECU 30 sets the final target throttle opening area TRT to a value obtained by subtracting the present throttle closing angle TRTCKB from the basic throttle angle TRTB. Afterward, the ECU 30 temporarily terminates subsequent processing. Accordingly, in this case, the value obtained by subtracting the presently increasing throttle closing angle TRTCKB is set as the final target throttle opening area TRT.

If it is determined that the pressure difference DPBK exceeds the negative pressure value tKPBKO in step 108, the ECU 30 proceeds to step 109 to decrease the throttle closing angle TRTCBK (and increase the target throttle opening area TRT). At step 109, the ECU 30 renews the throttle closing angle TRTCKB to a value obtained by subtracting a predetermined closing angle compensation value b (b is a constant value) from the throttle closing angle TRTCBK of the previous cycle.

In step 110, the ECU 30 determines whether the throttle closing angle TRTCBK corresponds to a value of zero. If it is determined that the throttle closing angle TRTCBK does not correspond to a value of zero, the ECU 30 proceeds to step 112 to compute the basic throttle angle TRTB. Subsequently, in step 113, the ECU 30 sets the final target throttle opening area TRT to a value obtained by subtracting the present throttle closing angle TRTCBK from the basic throttle angle TRTB. Afterward, the ECU 30 temporarily terminates subsequent processing. Accordingly, in this case, the value obtained by subtracting the presently decreasing value of the difference between the throttle closing angle TRTCBK and the basic throttle angle TRTB is set as the final target throttle opening area TRT.

If the throttle closing angle TRTCBK corresponds to a value of zero in step 110, the ECU 30 proceeds to step 111. At step 111, the ECU 30 sets the execution flag XBKIDL to zero to terminate the stratified charge brake control mode. The ECU 30 then carries out steps 112, 113 and temporarily terminates subsequent processing. When the ECU 30 proceeds from step 111 to step 112, the value of the throttle closing angle TRTCBK is set at zero. Thus, the basic throttle angle TRTB is set equal to the final target throttle opening are TRT.

In step 102, if the present vehicle speed SPD is equal to or higher than the predetermined speed, the ECU 30 proceeds to step 114 to temporarily perform uniform charge combustion while executing throttle angle control (uniform charge combustion brake control).

In step 114, the ECU 30 determines whether the present pressure difference DPBK is smaller than the negative pressure value tKPBKLS at which the uniform charge brake control is initiated (e.g., 300 mmHg). If it is determined that the pressure difference DPBK is equal to or greater than the negative pressure value tKPBKLS, there is no need to produce negative pressure. In this case, the ECU 30 jumps to step 120. If the pressure difference DPBK is smaller than the negative pressure value tKPBKLS, the ECU 30 determines that negative pressure is insufficient and proceeds to step 115. At step 115, the ECU 30 sets the execution flag XBKDJ at one to execute uniform charge combustion control.

In step 116, the ECU 30 adds one to the count value CBKDJ of a counter in an incremental manner.

In step 117, the ECU 30 determines whether the count value CBKDJ is greater than a predetermined value (eight in the embodiment). The predetermined value corresponds to the period of time that is necessary to stabilize the brake booster pressure DPBK when performing uniform charge combustion. If the count value CBKDJ is greater than the predetermined value of eight, the ECU 30 proceeds to step 119. If the count value CBKFJ is not yet greater than the value of eight, the ECU 30 proceeds to step 118. In step 118, the ECU 30 determines whether the present pressure difference DPBK is greater than the negative pressure value tKPBKSO at which the uniform charge combustion brake control is terminated (e.g., 350 mmHg). If the brake booster pressure DPBK is equal to or lower than the negative pressure value tKPBKSO, the ECU 30 returns to step 115. This is repeated until the count value CBKDJ becomes greater than the predetermined value of eight or until the brake booster pressure DPBK becomes greater than the negative pressure value tKPBKSO. In other words, the uniform combustion mode is continued until the negative pressure becomes sufficient.

When the count value CBKDJ becomes greater than the predetermined value of eight or when the brake booster pressure DPBK becomes greater than the negative pressure value tKPBKSO, the ECU 30 proceeds to step 119 to terminate the uniform charge combustion. In step 119, the uniform charge combustion flag XBKDJ is set at zero.

When the ECU 30 proceeds to step 120 from step 114 or step 119, the ECU 30 clears the count value CBKDJ to zero. The ECU 30 then proceeds to steps 112, 113 and subsequently terminates subsequent processing.

In the negative pressure control routine, the pressure difference DPBK is computed from the atmospheric pressure PA and the brake booster pressure PBK. When the pressure difference DPBK is smaller than the negative pressure value tKPBKL that initiates stratified charge brake control or the negative pressure value tKPBLKS that initiates uniform charge brake control, the close control of the throttle valve 23 is performed. If the vehicle speed SPD is lower than the predetermined speed SPD, the ECU 30 executes negative pressure control when the stratified charge combustion is performed. If the vehicle speed SPD is equal to or greater than the predetermined speed, the ECU 30 executes negative pressure control when the uniform charge combustion is performed.

Figure 7:
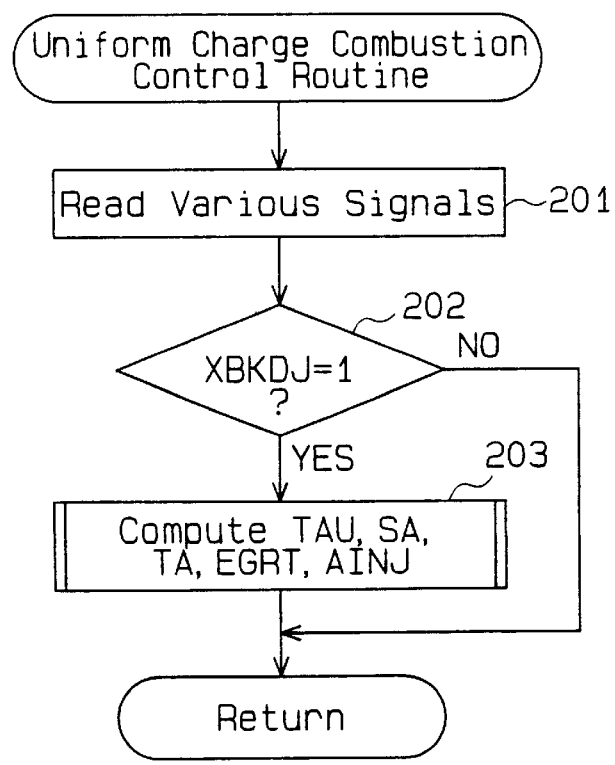
FIG. 7 is a flowchart illustrating the uniform charge combustion control routine.

The uniform charge combustion control routine for computing various parameters when controlling negative pressure during uniform charge combustion (uniform charge brake control) will now be described with reference to FIG. 7.

When entering this routine, in step 201, the ECU 30 reads various detecting signals, such as the degree of acceleration pedal depression ACCP and the engine speed NE. In step 202, the ECU 30 determines whether the flag XBKDJ indicating execution of the uniform charge brake control is set at one. If the flag XBKDJ is not set at one, the ECU 30 determines that uniform charge combustion is not being performed and terminates subsequent processing. If the flag XBKDJ is set at one, in step 203, the ECU 30 computes the target fuel injection amount TAU for uniform charge combustion, the target ignition timing SA, the target throttle angle TA, the target EGR opening area EGRT, and the basic fuel injection timing AINJ.

Accordingly, in the uniform charge combustion control routine, when the flag XBKDJ is set at one, various parameters for uniform charge combustion are computed. Based on these parameters, the actuators (the fuel injection valve 11, the ignitor 12, the step motor 22, the EGR valve 53, etc.) are controlled.

In this embodiment, it is determined whether there is a need to produce negative pressure to actuate the brake booster 71 (steps 104, 112). If it is determined that negative pressure must be produced, the close control of the throttle value 23 is carried out. The closing of the throttle valve 23 produces negative pressure and ensures the actuation of the brake booster 71.

When determining whether it is necessary to produce negative pressure for the actuation of the brake booster 71, the ECU 30 computes the pressure difference DPBK by subtracting the brake booster pressure PBK, which is detected by the pressure sensor 63, from the atmospheric pressure PA. When the pressure difference DPBK is smaller than the negative pressure value tKPBKL, which initiates stratified charge brake control, or the negative pressure value tKPBKLS, which initiates uniform charge brake control, the ECU 30 executes the close control of the throttle value 23 (negative pressure producing control).

When traveling at a high altitude, the decrease in the atmospheric pressure PA causes the brake booster pressure PBK to be lower than when traveling at a low altitude. Accordingly, the brake booster pressure PBK may be low while the actual negative pressure for actuating the brake booster 71 is insufficient. However, in this embodiment, the closing control of the throttle valve 23 is executed to produce negative pressure when the pressure difference DPBK, is smaller than the reference value (negative pressure value tKPBKL for initiating stratified charge brake control or the negative pressure value tKPBKLS for initiating uniform charge brake control). This always guarantees sufficient negative pressure for the actuation of the brake booster 71 even when the atmospheric pressure PA fluctuates such as when traveling at high altitudes.

When the vehicle speed SPD is equal to or greater than the predetermined speed and the brake booster pressure DPBK is lower than the uniform charge brake control initiating negative pressure value tKPBKLS, the combustion is forcibly switched from stratified charge combustion to uniform charge combustion. This avoids insufficient negative pressure when opening the throttle valve 23 to increase speed during stratified charge combustion. The required negative pressure that corresponds to the running state of the engine is achieved and actuation of the brake booster 71 is guaranteed.

Furthermore, the engine 1 returns to stratified mode combustion when a predetermined time period elapses after switching to uniform charge combustion. This prevents degradation in the duel efficiency due to continued uniform charge combustion. The predetermined time period is the time necessary to produce sufficient negative pressure for the brake booster 71. Thus, the engine 1 readily returns to stratified charge combustion after producing as much negative pressure as possible for each running state of the engine.

The engine 1 forcibly returns to stratified charge combustion when the brake booster pressure DPBK becomes greater than the uniform charge brake control terminating pressure value tKPBKSO. In this case, the engine 1 returns to stratified charge combustion regardless of the elapsed time period. This enables the engine 1 to readily return to the stratified charge combustion after the negative pressure becomes sufficient. As a result, fuel efficiency is enhanced.

Furthermore, the closing control of the throttle valve 23 is executed if the pressure difference DPBK is smaller than the reference value (negative pressure value tKPBKL for initiating stratified charge brake control or negative pressure value tKPBKLS for initiating uniform charge brake control), and the closing control is terminated if the pressure difference DPBK becomes greater than a larger reference value (negative pressure value tKPBKO for terminating stratified charge brake control or negative pressure value tKPBKSO for terminating uniform charge brake control). In other words, the reference value has a hysteresis. This prevents hunting caused by the pressure difference DPBK becoming smaller than the reference value and then equal to or greater than the reference value in a repetitive manner. Repetitive execution and non-execution of the closing control does not take place.

Although the opening area of the intake passage is narrowed to produce negative pressure, an electronically controlled throttling mechanism that includes the throttle value 23 and the step motor 22 is employed as a means to guarantee negative pressure. Thus, conventional devices are used to produce negative pressure. This lowers costs.

In this embodiment, when increasing the throttle closing angle TRTCBK, the throttle closing angle TRTCBK is renewed by adding the presently set closing angle compensation value b to the throttle closing angle TRTCBK of the previous cycle. The closing angle compensation value a is set at a large value if the pressure difference DPBK is much smaller than the negative pressure value tKPBKO for terminating stratified charge brake control. Therefore, the closing speed is high immediately after the initiation of the closing control. This readily guarantees negative pressure.

If the pressure difference DPBK approaches the negative pressure value tKPBKO for terminating stratified charge brake control, the closing angle compensation value a is set at a small value. Thus, when a certain time elapses after starting the closing control, the closing speed decreases. This suppresses overshooting of the closing action and the negative pressure. As a result, a state in which the intake air amount is small due to the continuance of the close control regardless of the negative pressure being sufficient is avoided. This prevents undesirable combustion.

A second embodiment according to the present invention will now be described. To avoid a redundant description, like or same numerals are given to those components that are like or the same as the corresponding components of the first embodiment.

In the first embodiment, when the vehicle speed SPD is equal to or higher than the predetermined speed and the brake booster pressure DPBK is smaller than the negative pressure value tKPBKLS that initiates uniform charge brake control, the engine 1 switches to uniform charge combustion from stratified charge combustion. After the predetermined time period elapses, the engine 1 returns to stratified charge combustion. Thus, after returning to stratified charge combustion, the engine 1 may again return to uniform charge combustion when the above conditions are satisfied. Such repetition may result in hunting.

Figure 8:
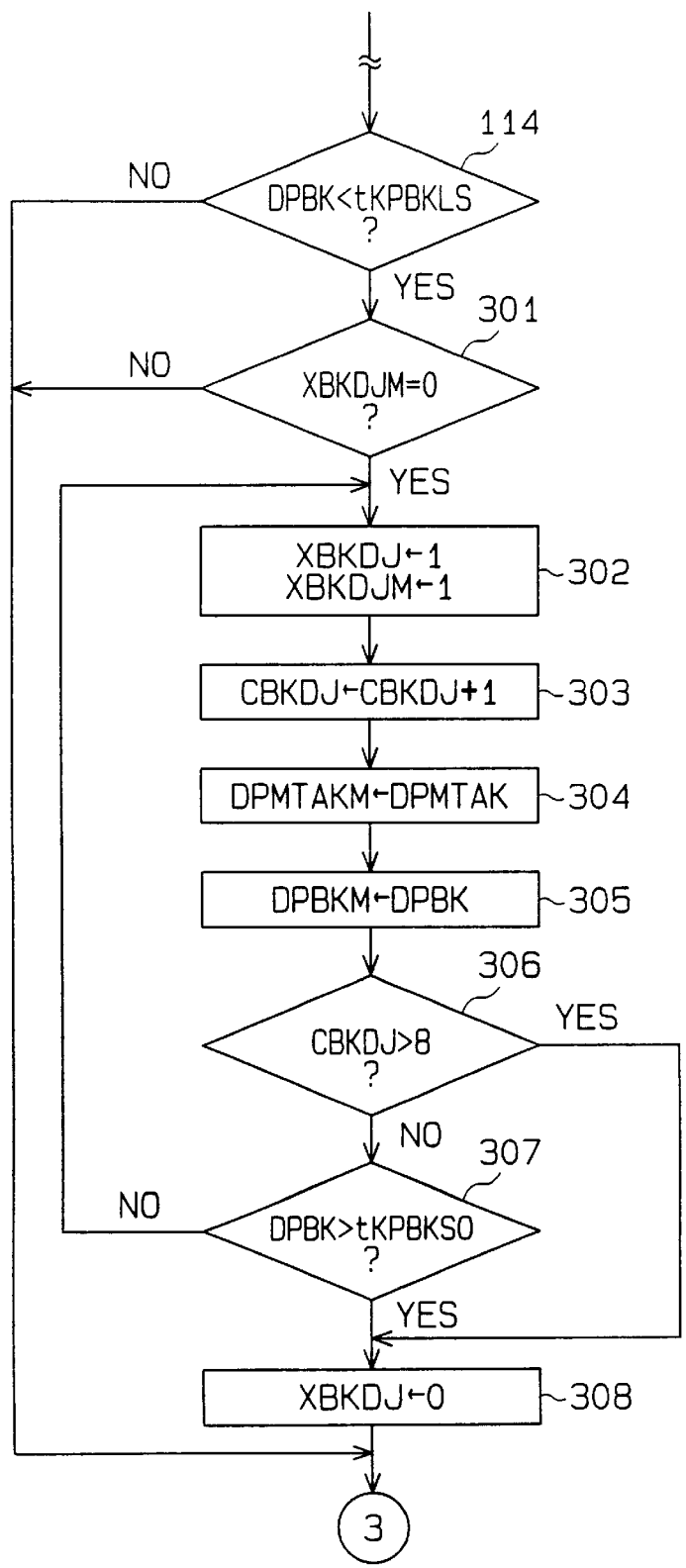
FIG. 8 is a flowchart illustrating the negative pressure control routine executed by the ECU in a second embodiment according to the present invention.
Figure 9:
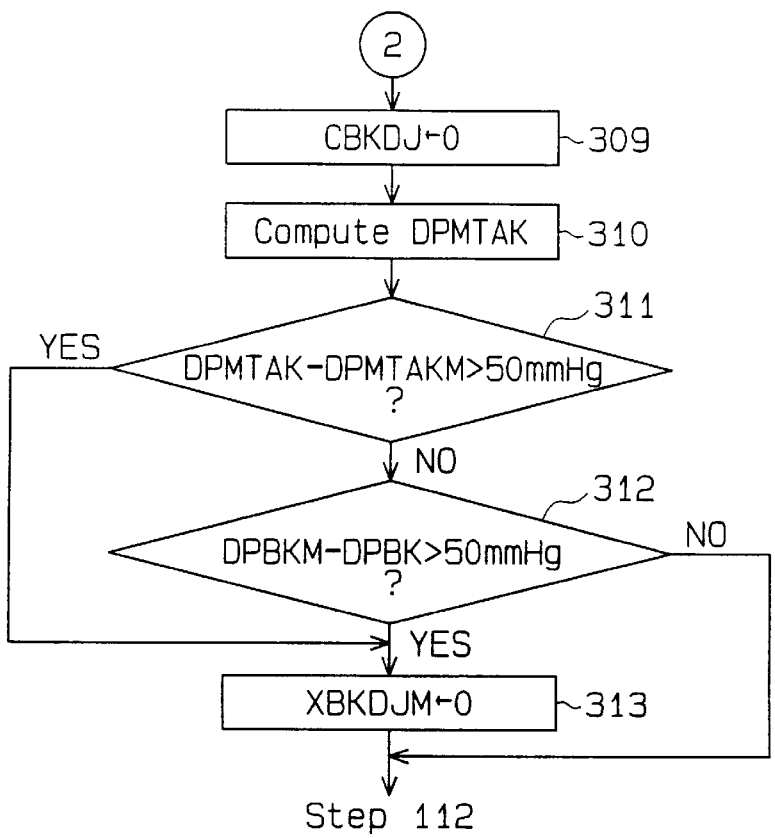
FIG. 9 is a flowchart illustrating the negative pressure control routine that continues from FIG. 8.

This embodiment copes with such problems. A portion of the negative pressure control routine executed by the ECU 30 is shown in the flowcharts of FIGS. 8 and 9.

In step 102, which is shown in FIG. 4, if the vehicle speed SPD is equal to or higher than the predetermined speed, the ECU 30 proceeds to step 114. In step 114, the ECU 30 determines whether the present pressure difference DPBK is smaller than the negative pressure value tKPBKLS at which the uniform charge brake control is initiated (e.g., 300 mmHg). If it is determined that the pressure difference DPBK is equal to or greater than the negative pressure value tKPBKLS, there is no need to produce negative pressure. In this case, the ECU 30 jumps to step 309. If the pressure difference DPBK is smaller than the negative pressure value tKPBKLS, the ECU 30 determines that negative pressure may be insufficient. In this case, the ECU 30 proceeds to step 301.

At step 301, the ECU 30 determines whether the uniform charge brake control history flag XBKDJM is set at zero. The history flag XBKDJM indicates whether there is a history of uniform charge brake control being carried out and indicates whether to prohibit returning to the uniform charge brake control. When returning to the uniform charge brake control is prohibited, the history flag XBKDJM is set at one. If returning is allowed, the history flag XBKDJM is set at zero. If the history flag XBKDJM is set at one, uniform charge brake control will not be carried out. In this case, the ECU 30 proceeds to step 309. If the history flag XBKDJM is set at zero, the ECU 30 proceeds to step 302.

In step 302, the ECU 30 sets the uniform charge brake control execution flag XBKDJM at one. The ECU 30 also sets the history flag XBKDJM at one.

Figure 10:
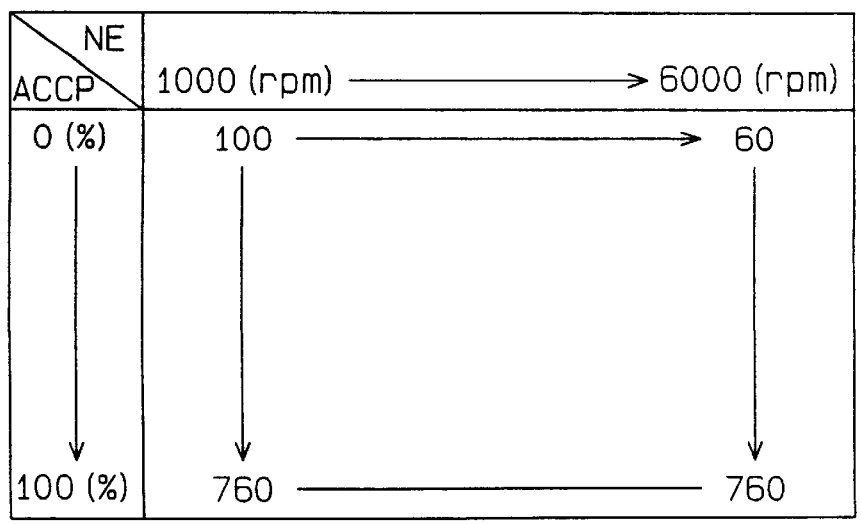
FIG. 10 is a map showing the relationship between the engine speed and the acceleration depression amount with respect to the assumed intake pressure.

In step 303, the ECU 30 adds one to the count value CBKDJ of the counter in an incremental manner. In step 304, the ECU 30 computes the assumed pressure difference DPMTAK. The assumed pressure difference DPMTAK is set and stored as the uniform charge assumed pressure difference DPMTAKM. The uniform charge assumed pressure difference DPMTAKM refers to the difference of the assumed intake pressure PMTAK with respect to the atmospheric pressure PA when performing uniform charge combustion. As shown in FIG. 10, the assumed intake pressure PMTAK is obtained through a map, plotted by experiment results, by referring to the degree of acceleration pedal depression ACCP and the engine speed NE. In the map, if the degree of acceleration pedal depression ACCP is small, the assumed intake pressure PMTAK is small and the assumed pressure difference DPMTAK is large.

In step 305, the ECU 30 sets and stores the brake booster pressure DPBK as the uniform charge brake booster pressure DPBKM.

In step 306, the ECU 30 determines whether the count value CBKDJ is greater than a predetermined value (eight in the embodiment). The predetermined value corresponds to the period of time that is necessary to stabilize the brake booster pressure DPBK when performing uniform charge combustion. If the count value CBKDJ is greater than the predetermined value of eight, the ECU 30 temporarily terminates uniform charge combustion and proceeds to step 308.

If the count value CBKDJ is not yet greater than the value of eight, the ECU 30 proceeds to step 307. In step 307, the ECU 30 determines whether the present pressure difference DPBK is higher than the negative pressure value tKPBKSO at which the uniform charge combustion brake control is terminated (e.g., 350 mmHg). If the brake booster pressure DPBK is not higher than the negative pressure value tKPBKSO, the ECU 30 returns to step 302. This is repeated until the count value CBKDJ becomes greater than the predetermined value of eight or until the brake booster pressure DPBK becomes greater than the negative pressure value tKPBKSO. In other words, the uniform combustion mode is continued until the negative pressure becomes sufficient.

When the count value CBKDJ becomes greater than the predetermined value of eight or when the brake booster pressure DPBK becomes greater than the negative pressure value tKPBKSO, the ECU 30 proceeds to step 308 to terminate the uniform charge combustion. In step 308, the uniform charge combustion flag XBKDJ is set at zero.

When the ECU 30 proceeds to step 309 from steps 114, 301, or 308, the ECU 30 clears the count value CBKDJ to zero.

In step 310, the ECU 30 computes the present assumed pressure difference DPMTAK (when the uniform charge combustion is terminated). The assumed pressure difference is obtained by comparing the assumed intake pressure PMTAK when performing uniform charge combustion to the atmospheric pressure PA in the same manner as in step 304.

In step 311, the ECU 30 determines whether the value obtained by subtracting the uniform charge assumed pressure difference DPTAKM, which has been stored in step 304, from the assumed pressure difference DPMTAK, which has been computed in step 310, is greater than a predetermined value (in this embodiment, 50 mmHg). In other words, the ECU 30 determines whether it has become easier to produce negative pressure by switching to uniform charge combustion than in the previous cycle. If the value obtained in step 311 is greater than a predetermined value, the ECU 30 proceeds to step 313 to switch to uniform charge combustion.

At step 313, the ECU 30 sets the uniform charge brake control history flag XBKDJM to zero. This enables the engine 1 to enter uniform charge combustion. Afterward, the ECU 30 proceeds to step 112, which is described in the first embodiment.

If the computed value in step 311 is not greater than the predetermined value, the negative pressure produced in the present combustion mode is almost the same as the negative pressure produced by performing uniform charge combustion. In this case, the ECU 30 proceeds to step 312.

In step 312, the ECU 30 determines whether the value obtained by subtracting the present brake booster pressure DPBK from the uniform charge brake booster pressure DPBKM is greater than a predetermined value (in this embodiment, 50 mmHg). In other words, the ECU 30 determines whether the present brake booster pressure DPBK is decreasing greatly with respect to the uniform charge brake booster pressure DPBK. If the computed value is greater than 50 mmHg, this indicates that the negative pressure has already been used due to the depression of the brake pedal. In this case, the ECU 30 proceeds to step 313 to allow switching to uniform charge combustion.

In step 313, the ECU 30 sets the uniform charge brake control history flag XBKDJM as zero. This enables the ECU 30 to return to uniform charge brake control. If the value obtained in step 312 is not greater than 50 mmHg, the ECU 30 determines that further negative pressure need not be produced. In this case, the ECU 30 proceeds to step 112 without changing the history flag XBKDJM, which is set at one.

In addition to the advantageous effects obtained in the first embodiment, the following advantageous effects may also be obtained through this embodiment.

In the first embodiment, the engine 1 returns to stratified charge combustion regardless of the brake booster pressure DPBK after uniform charge combustion has been carried out for a predetermined period of time. Thus, if the acceleration pedal is depressed after re-entering stratified charge combustion, the negative pressure becomes insufficient. In this case, the engine 1 immediately returns to uniform charge combustion. Accordingly, there is a possibility that uniform and stratified charge combustion are alternated repeatedly. However, in this embodiment, if the engine 1 returns to stratified charge combustion from uniform charge combustion, the ECU 30 decides whether it is better to remain in the stratified charge combustion or to return to the uniform charge combustion to ensure the required negative pressure. Accordingly, this prevents hunting and stabilizes the operation of the engine 1.

Although only two embodiments of the present invention has been described so far, it should be apparent to those skilled in the art that the present invention may be embodied in many other specific forms without departing from the spirit or scope of the invention. More particularly, the present invention may be modified as described below.

(1) In the illustrated embodiment, an electronically controlled throttle mechanism is used as the negative pressure producing means. The throttle mechanism includes the throttle value 23 arranged in the intake duct 20, and the step motor 22 serving as an actuator for opening and closing the throttle value 23. However, an idle speed control (ISC) mechanism may be used as the negative pressure producing means. Such an ISC mechanism includes an idle speed control valve arranged in an intake passage that bypasses the throttle value 23 and an actuator for opening and closing the control valve.

The EGR mechanism 51 provided with the EGR valve 53 and other parts may also be employed as the negative pressure producing means.

Negative pressure producing mechanisms other than those shown in the drawings may also be employed. For example, a mechanical throttle valve that is linked to the acceleration pedal may be used in lieu of the electronically controlled throttle valve.

(2) In the illustrated embodiment, the computation of the closing compensation angle a enables the closing speed of the throttle valve 23 to be variable. However, the closing speed may be constant. Furthermore, in the preferred and illustrated embodiment, the fuel injection timing is altered when executing the closing control while performing stratified charge combustion. However, the closing control may be eliminated.

(3) The present invention is applied to the cylinder injection type engine 1 in the illustrated embodiment. The present invention may also be applied to an engine that performs stratified charge combustion and weak stratified charge combustion. For example, the present invention may be applied to an engine that injects fuel beneath the intake valves 6a, 6b provided in the associated intake ports 7a, 7b. The present invention may also be applied to an engine that injects fuel directly into the cylinder bores (combustion chambers 5) from injection valves arranged near the intake valves 6a, 6b. As another option, the present invention may be applied to an engine that does not perform stratified charge combustion.

(4) In the illustrated embodiment, helical type intake ports are employed to produce swirls. However, the swirls do not necessarily have to be produced. In such case, parts such as the swirl control valve 17 and the step motor 19 may be eliminated.

(5) The present invention is applied to a gasoline engine in the illustrated embodiment. However, the present invention may also be applied to other types of engines such as diesel engines.

(6) In the illustrated embodiment, the atmospheric pressure PA is detected by the intake pressure sensor 61. However, an atmospheric pressure sensor may be provided to detect the atmospheric pressure.

Therefore, the present examples and embodiments are to be considered as illustrative and not restrictive and the invention is not to be limited to the details given herein, but may be modified within the scope of the appended claims.

What is claimed is:

1. An apparatus for controlling brake force of a vehicle movable based on rotation of an engine with a plurality of cylinders, each of said cylinders having a combustion chamber that receives fuel from a fuel injector and air from an air intake passage, wherein said air and fuel are mixed and combusted in the combustion chamber, wherein said engine selectively performs a stratified charge combustion and a uniform charge combustion, and wherein said stratified charge combustion mode is selected to increase at least the amount of the air supplied to the engine and improve a combusting state of the engine, said apparatus comprising:

a brake booster for increasing said brake force in accordance with negative pressure applied thereto;

means for restricting airflow in the air intake passage to generate the negative pressure that is supplied to the brake booster;

a fuel injector for directly injecting the fuel into the cylinder to set the engine to perform the stratified charge combustion;

means for measuring the amount relating to the pressure applied to the brake booster;

means for determining the amount relating to the pressure in the brake booster being smaller than a predetermined value;

means for actuating the restricting means to apply the negative pressure to the brake booster when the amount relating to the pressure in the brake booster is smaller than the predetermined value, said actuating means converting a running condition of the engine from the stratified charge combustion to the uniform charge combustion.

2. The apparatus as set forth in claim 1, further comprising means for counting a time period of the uniform charge combustion; and means for re-converting the running condition of the engine from the uniform charge combustion to the stratified combustion when the counted time period is in excess of a reference time period.

3. The apparatus as set forth in claim 2, wherein said reference time period is predetermined to stabilize the level of the negative pressure in the brake booster.

4. The apparatus as set forth in claim 3 further comprising second re-converting means for forcibly re-converting the running condition of the engine from the uniform charge combustion to the stratified combustion when the amount is larger than the predetermined value.

5. The apparatus as set forth in claim 4, wherein said measuring means includes:

a first sensor for detecting a first amount of the pressure in the brake booster;

a second sensor for detecting a second amount of air pressure; and first computing means for computing a difference between the first amount and the second amount.

6. The apparatus as set forth in claim 5, wherein said restricting means includes:

a throttle valve disposed in the air intake passage; and a motor for rotating the throttle valve in a first direction to open the air intake passage and in a second direction to close the air intake passage, wherein said actuating means actuates the motor to generate the negative pressure.

7. The apparatus as set forth in claim 6, further comprising:

second computing means for computing a target opening size of the throttle valve based on the operation state of the engine; and correcting means for decreasing the target amount of the throttle valve to generate the negative pressure required to actuate the throttle valve.

8. The apparatus as set forth in claim 7, wherein said correcting means includes mapping means for storing a correcting value that corrects a moving speed of the throttle valve.

9. An apparatus for controlling brake force of a vehicle movable based on rotation of an engine with a plurality of cylinders, each of said cylinders having a combustion chamber that receives fuel from a fuel injector and air from an air intake passage, wherein said air and fuel are mixed and combusted in the combustion chamber, wherein said engine selectively performs a stratified charge combustion and a uniform charge combustion, and wherein said stratified charge combustion mode is selected to increase the amount of at least the air supplied to the engine and improve a combusting state of the engine, said apparatus comprising:

a brake booster for increasing said brake force in accordance with negative pressure applied thereto;

a throttle valve disposed in the air intake passage to restrict airflow in the air intake passage and generate the negative pressure that is supplied to the brake booster;

a fuel injector for directly injecting the fuel into the cylinder to set the engine to perform the stratified charge combustion;

a first sensor for detecting a first amount of the pressure in the brake booster;

a second sensor for detecting a second amount of air pressure; and first computing means for computing a difference between the first amount and the second amount;

means for determining the difference being smaller than a predetermined value;

means for actuating the restricting means to apply the negative pressure to the brake booster when the difference is smaller than the predetermined value, said actuating means converting a running condition of the engine from the stratified charge combustion to the uniform charge combustion;

means for counting a time period of the uniform charge combustion; and means for re-converting the running condition of the engine from the uniform charge combustion to the stratified combustion mode when the counted time period is in excess of a reference time period.

10. The apparatus as set forth in claim 9, wherein said reference time period is predetermined to stabilize the level the negative pressure in the brake booster.

11. The apparatus as set forth in claim 10, further including a motor that rotates the throttle valve in a first direction to open the air intake passage and in a second direction to close the air intake passage, wherein said actuating means actuates the motor to close the air intake passage when the difference is smaller than the reference value.

12. The apparatus as set forth in claim 11, further comprising:

second computing means for computing a target opening size of the throttle valve based on the operation state of the engine; and correcting means for correcting the target opening size of the throttle valve based on the negative pressure required to actuate the brake booster.

13. The apparatus as set forth in claim 12, wherein said correcting means includes mapping means for storing a correcting value that corrects a moving speed of the throttle valve.

14. The apparatus as set forth in claim 13, further comprising an electronic control unit that forms said first computing means, second computing means, determining means, actuating means, counting means, re-converting means and correcting means.

* * * * *

UNITED STATES PATENT AND TRADEMARK OFFICE
CERTIFICATE OF CORRECTION

PATENT NO. : 5,915,357
DATED     : June 29, 1999
INVENTOR(S) : Jun HARADA and Hiroyuki MIZUNO It is certified that error appears in the above-identified patent and that said Letters Patent is hereby corrected as shown below:

On the title page,
          change [73] Assignee: Toyota Kidosha Kabushiki Kaisha,
                                Toyota, Japan to:

[73] Assignee: Toyota Jidosha Kabushiki Kaisha,
                  Toyota, Japan

Signed and Sealed this

Eighteenth Day of July, 2000

*Attest:*

Q. TODD DICKINSON

*Attesting Officer*        *Director of Patents and Trademarks*